GRINDER WITH OSCILLATING HEAD

Filed March 29, 1956

8 Sheets-Sheet 1

INVENTOR.
MILES M. BASS
RAMSAY M. BELL
LEE C. HAMMOND
PHILIP J. ROBISCHUNG
BY
Woodhams Blanchard & Flynn
ATTORNEYS INVENTOR.
MILES M. BASS
RAMSAY M. BELL
LEE C. HAMMOND
PHILIP J. ROBISCHUNG
BY
Woodhams Blanchard and Flynn
ATTORNEYS

GRINDER WITH OSCILLATING HEAD

Filed March 29, 1956 8 Sheets-Sheet 3

INVENTOR.
MILES M. BASS
RAMSAY M. BELL
LEE C. HAMMOND
PHILIP J. ROBISCHUNG
BY
Woodhams Blanchard & Flynn
ATTORNEYS Jan. 26, 1960 M. M. BASS ET AL 2,922,258

GRINDER WITH OSCILLATING HEAD

Filed March 29, 1956 8 Sheets-Sheet 4

INVENTOR.
MILES M. BASS
RAMSAY M. BELL
LEE C. HAMMOND
PHILIP J. ROBISCHUNG
BY
Woodhams Blanchard & Flynn
ATTORNEYS

INVENTOR.
MILES M. BASS
RAMSAY M. BELL
BY LEE C. HAMMOND
PHILIP J. ROBISCHUNG

Woodhams Blanchard & Flynn
ATTORNEYS

GRINDER WITH OSCILLATING HEAD

Filed March 29, 1956 8 Sheets-Sheet 6

INVENTOR.
MILES M. BASS
RAMSAY M. BELL
LEE C. HAMMOND
PHILIP J. ROBISCHUNG
BY
Woodhams Blanchard & Flynn
ATTORNEYS

INVENTOR.
MILES M. BASS
RAMSAY M. BELL
BY LEE C. HAMMOND
PHILIP J. ROBISCHUNG

Woodhams Blanchard & Flynn
ATTORNEYS

GRINDER WITH OSCILLATING HEAD

Filed March 29, 1956 8 Sheets-Sheet 8

INVENTOR.
MILES M. BASS
RAMSAY M. BELL
LEE C. HAMMOND
PHILIP J. ROBISCHUNG
BY
Woodhams Blanchard & Flynn
ATTORNEYS 2,922,258

GRINDER WITH OSCILLATING HEAD

Miles M. Bass, Kalamazoo, Ramsay M. Bell, Schoolcraft, and Lee C. Hammond and Philip J. Robischung, Kalamazoo, Mich., assignors to Hammond Machinery Builders, Inc., Kalamazoo, Mich., a corporation of Michigan Application March 29, 1956, Serial No. 574,728

5 Claims. (Cl. 51—55)

This invention relates to a grinder and particularly to one in which the grinding wheel may be caused to oscillate at a controllable frequency and amplitude.

In conventional tool grinding equipment, it is customary to provide a rotatable grinding wheel adjacent a work supporting table. The table is normally movable for adjustment relative to the axis of the grinding wheel, so that the plane defined by the working surface of the wheel and the plane defined by the table top will intersect at whatever angle is desired to facilitate grinding the work in a desired manner. However, in all of these grinders, insofar as we are aware, it is necessary for the workman who is utilizing the machine, such as for grinding a tool point, to manually move the tool point across the working face of the grinding wheel. The reasons for such movement of the tool point across the face of the grinding wheel are well known to the industry and may be summarized here by pointing out that such movement of the tool tends both to speed the grinding operation and to work out any irregularities which may exist in the face of the grinding wheel, i.e., "dress" the wheel. This latter tends to secure a more nearly flat and a more smoothly ground surface than would be possible if no such movement of the tool point were employed. Further, this movement of the tool point effects a desirable amount of so-called "cross-grain" grinding and prevents the wheel grit from channeling the work.

This movement, while universally practiced where tool points and grinders are used, is nevertheless tedious, time consuming and tiring to the workman. Also, it is difficult to grind a tool accurately while manually moving it along a table and with respect to a grinding surface. Further, where the tool is moved relative to the table, the table becomes worn, and such wear is often sufficient to alter the positional relationship between a tool being held on the table and the wheel.

These disadvantages of the technique previously employed have long been recognized, but no acceptable provision for solving them has, insofar as we are aware, been offered to the industry. It is recognized that some machines have been provided which hold the tool mechanically and provide a relative oscillation between the wheel and the tool, but these machines are relatively expensive, are often difficult to utilize, and their use is limited to conditions involving high production operation.

It is therefore desirable to provide a tool grinding machine adaptable to general use, by which a workman can maintain all of the precision and individual attention to the exact shaping of the tool point, which is customarily obtained where the tool point is guided by hand, while avoiding the fatigue, inconvenience and occasional inaccuracy which sometimes occurs where the relative motion of the tool with respect to the axis of the grinding wheel is provided by manually moving the tool across the face of the grinding wheel.

Accordingly, a principal object of the invention has been the provision of a grinding machine effective for obtaining the individual shaping of the work, such as a tool point, which is customarily obtainable by hand guiding of said work with respect to the grinding surface, while eliminating the fatigue, inaccuracy and inconvenience of manually moving the work back and forth across the face of the grinding wheel.

A further object of the invention has been to provide a machine, as aforesaid, in which the workman can hold the work, especially a tool point, stationary with respect to a supporting table, either with or without assistance of a mechanical holder or guide, and the relative motion of the work with respect to the axis of the grinding wheel is provided by the machine.

A further object of the invention has been to provide a machine, as aforesaid, having a device by which the axis of the grinding wheel is caused to oscillate with respect to the work supporting table.

A further object of the invention has been to provide a device, as aforesaid, in which either or both the frequency and amplitude of said oscillations are individually controllable.

A further object of the invention has been to provide a machine, as aforesaid, in which the preceding named objectives may be accomplished while retaining the previously conventional practice of adjusting the table to change the angle between the plane of the grinding face of the wheel and the plane of the work supporting surface of the table.

A further object of the invention has been to provide a device, as aforesaid, by which the foregoing named objectives may be accomplished in a machine capable of relatively general use.

A further object of the invention has been to provide a machine, as aforesaid, in which the several adjustments above mentioned may be made simply, accurately, and while the machine is in motion, and wherein the machine will remain in an adjusted condition reliably through any ordinary term of use.

A further object of the invention has been to provide a device, as aforesaid, which will be adaptable to use with many types of grinding wheels, but which will be specifically adapted to use with diamond filled grinding wheels.

A further object of the invention has been to provide a device, as aforesaid, which will also be adaptable to use with grinding wheels employing a technique commonly identified as "electrolytic grinding."

A further object of the invention has been to provide a device, as aforesaid, which will eliminate the inaccuracies resulting from wear of the table surface, which now sometimes occurs where the tool is moved along, and with respect to, the surface of the table.

A further object of the invention has been to provide a machine, as aforesaid, which can be employed by any ordinarily skilled personnel without requiring the use of techniques different from those which are already familiar.

A further object of the invention has been to provide a machine, as aforesaid, having portions of its work supporting table extending substantially across, and past, the periphery of said grinding wheel for supporting work, such as a tool having a reverse angle, of such shape that it must lie across, or past, the periphery of the wheel in order to present the surface to be ground to the working surface of the wheel, and yet such portions of the table are arranged so that said portions can be moved toward and away from the axis of said grinding wheel to accommodate the table to variations in amplitude of oscillations of said wheel.

A further object of the invention has been to provide a device having a work table, as aforesaid, with end portions extending through the extended plane of the working surface of the grinding wheel and including means associated with said grinding wheel for contacting and moving said portions away from said wheel prior to the striking thereof by said wheel, thereby protecting said wheel from contact with said portions.

A further object of the invention has been to provide a device, as aforesaid, including a guard extending around a substantial portion of said grinding wheel adjacent to its grinding face for preventing the tool, the operator's hands, or the like, from accidentally slipping past the periphery of the wheel and being damaged or injured thereby.

A further object of the invention has been to provide a device, as aforesaid, having a wheel supporting spindle which is adaptable for conversion without major change therein to double-end operation, whereby a second wheel and table arrangement may be provided adjacent to the opposite end of the spindle supporting the first named wheel.

A further object of the invention has been to provide a machine, as aforesaid, which will be adaptable for grinding tools of a variety of shapes.

A further object of the invention has been to provide a machine, as aforesaid, to which a hood may be readily attached for drawing off both the dust products of the grinding operation and whatever of the lubricating, coolant liquid and/or electrolyte, may be present in the form of droplets sufficiently fine to be carried in the air.

Other objects and purposes of the invention will be apparent to persons acquainted with equipment of this general type upon reading the following disclosure and inspecting the accompanying drawings.

Figures 12, 12A:
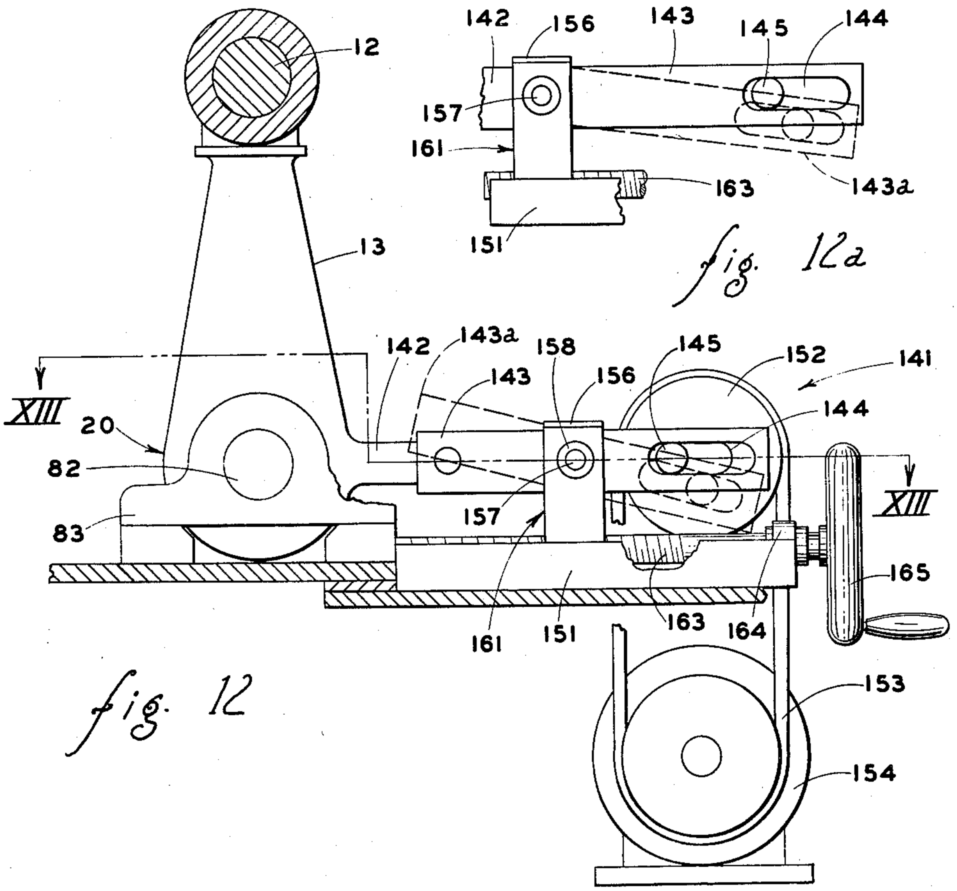
Figure 12 is a sectional view substantially as taken on the line XII—XII of Figure 1 and showing a modified form of the invention.

Figure 12*a* is a fragment of Figure 12.

Figure 13:
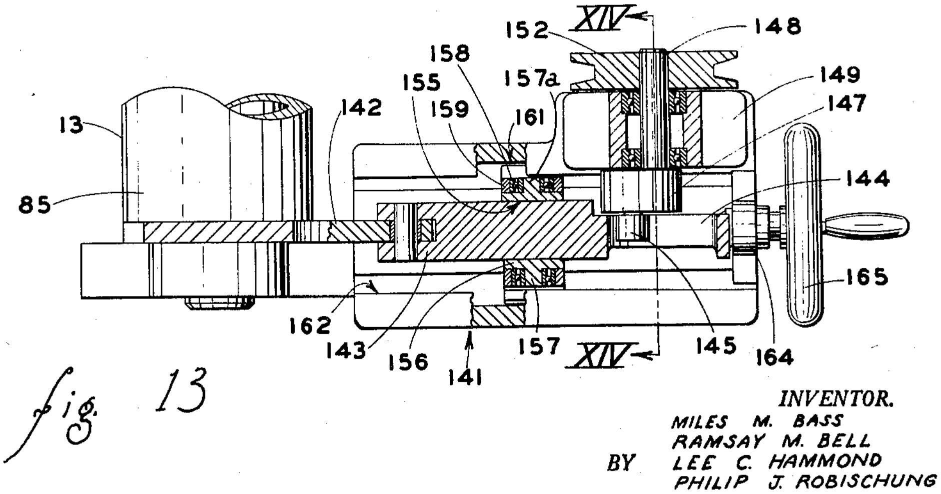

Figure 13 is a sectional view taken on the line XIII—XIII of Figure 12.

Figure 14:
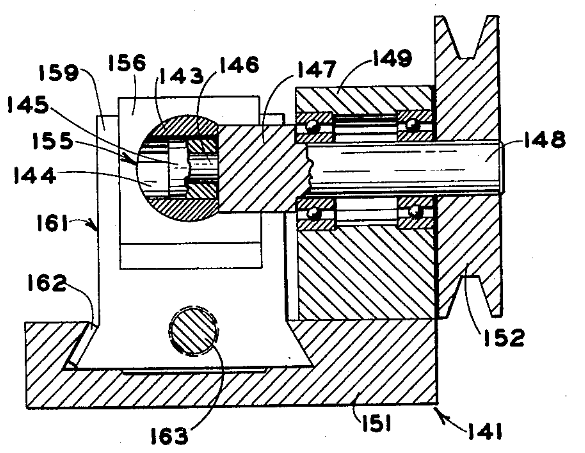

Figure 14 is a sectional view taken on the line XIV—XIV of Figure 13.

Figure 1:
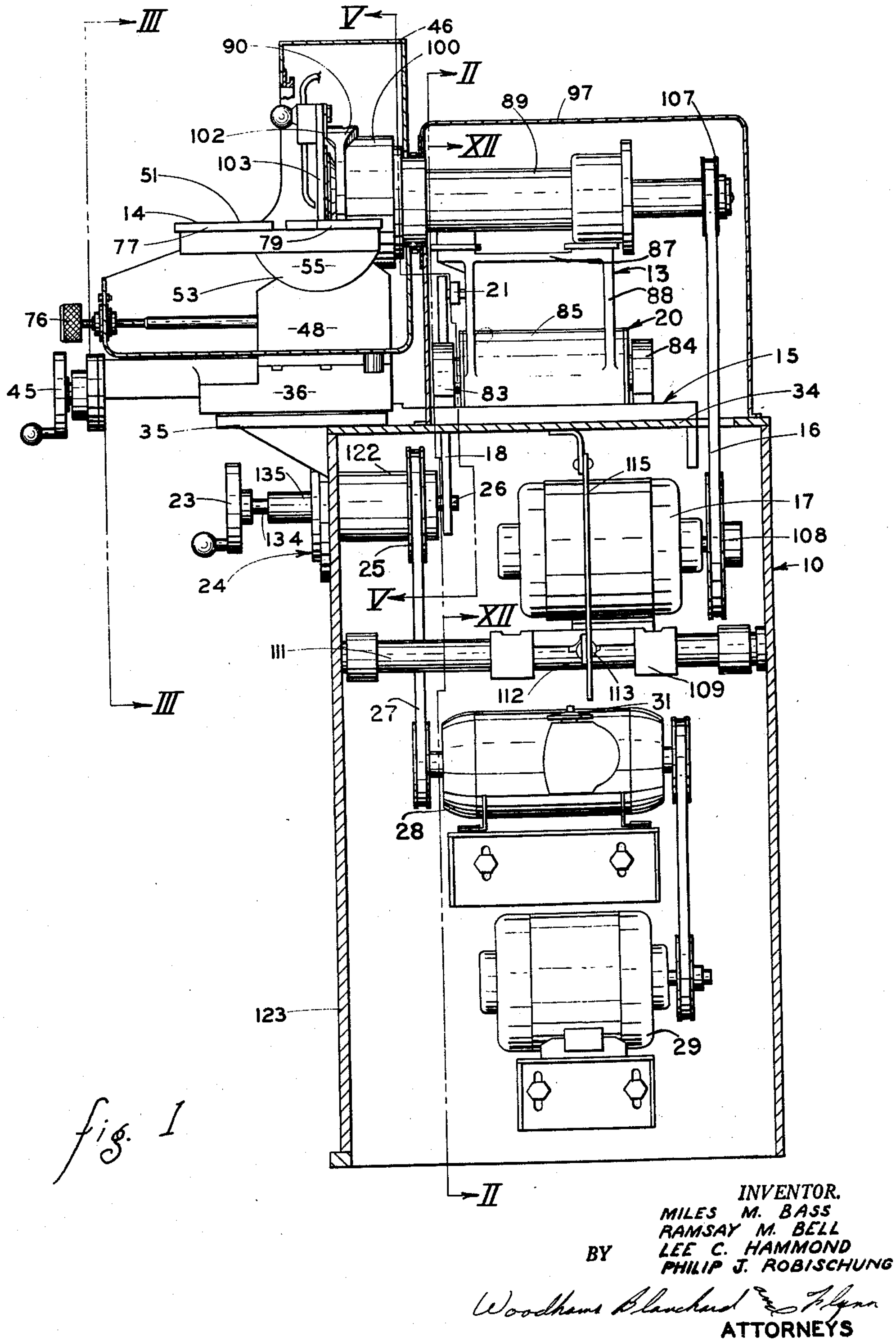
Figure 1 is a side elevational view of the machine to which this invention relates, with the adjacent side sheets thereof broken away.
Figure 2:
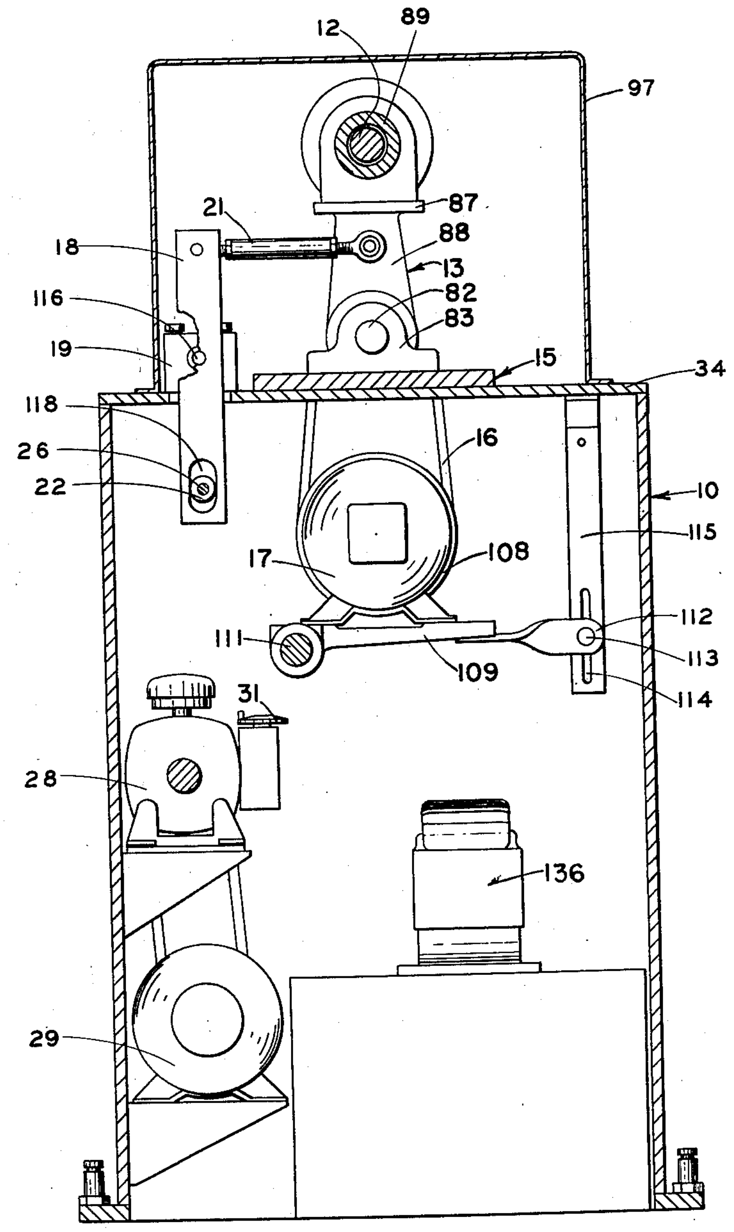
Figure 2 is a sectional view taken on the line II—II of Figure 1.

For the purpose of convenience in description, the terms "upper," "lower," "left," "right," and derivatives thereof, will have reference to the machine and parts thereof as appearing in Figure 2. The terms "front" and "rear" will have reference to the left and right sides, respectively, of the machine as appearing in Figure 1. The terms "inner," "outer," and derivatives thereof, will have reference to the geometric center of said machine and parts thereof.

GENERAL DESCRIPTION

In meeting the objects and purposes above set forth, we have provided a machine having an adjustable, but relatively stationary, table with which a manually operable tool holder may be used, if desired, said machine having a structure for supporting a rotatable grinding wheel adjacent to said table. The grinding wheel is mounted for oscillatory movement transversely of its rotational axis. During such movement, the center of said wheel traces an arcuate path which is generally parallel to the surface of the grinding table, that is, the tangent at the midpoint of said path is parallel both to the surface, and to an adjacent edge 50, of said table. This result is obtained by securing the grinding wheel 11 (Figures 1 to 4) to a shaft 12, which is rotatably mounted adjacent to the table 14 upon a shaft support bracket 13. The support bracket 13 is in turn pivotally supported by the bearing assembly 20 upon the platform 15 of the machine frame 10. The shaft 12 is continuously rotated by a belt 16 driven by the motor 17.

Oscillation of the bracket 13 about its pivotal support 20 is, in the preferred embodiment here shown, effected by a lever 18 (Figures 2 and 5) pivotally supported by the pillow block 19 on the upper wall 34 of frame 10 and connected to the bracket 13 by the pitman 21. The lower end of the lever 18 is caused to oscillate, or is alternatively held against oscillation, by a roller 22, which is mounted upon the shaft 26, rotatable at a controllable speed with the pulley 25. The shaft 26 may be moved radially of the axis of the pulley 25 by a hand wheel 23 working through a mechanism 24 for adjusting the amount of eccentricity of the shaft 26 with respect to said pulley. The amplitude of oscillatiion of said wheel 11 is, therefore, controlled by the eccentricity, if any, of the roller 22 with respect to said pulley 25. Rotation of said pulley 25 is secured through the belt 27 driven through a suitable speed reducer 28 from, and by, the motor 29. The speed of such oscillation is adjusted through the speed reducer 28 in response to adjustment of the hand wheel 23.

DETAILED CONSTRUCTION

A. *Frame and table*

Figure 10:
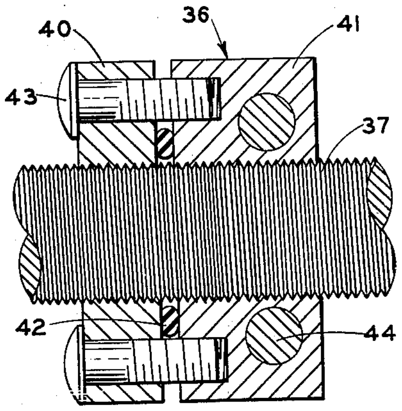
Figure 10 is a sectional view taken on the line X—X of Figure 4.

As shown particularly in Figures 1 and 2, the base frame 10 of the grinding machine to which this invention relates is upright, substantially rectangular, in this particular embodiment, and fabricated from any sturdy, conventional material, such as steel plates. A platform or bed plate 15 is mounted upon the upper wall 34 of the frame 10 and extends forwardly of the front wall 123 of the machine frame 10. The forward end of the platform 15 is provided with ways 35 on its upper surface, which engage and slidably support the base 36 of the table 14 for slidable, adjustable movement rearwardly and forwardly of the machine frame 10. Such movement is obtained by means of the threaded engagement between the screw 37 (Figures 3, 4 and 10) and the double or split nut 38, which has front and rear portions 40 and 41, respectively, through both of which the screw 37 is threadedly received. Said portions 40 and 41 are separated by a resilient grommet 42, through which said screw 37 extends, and are adjustably held together by a pair of adjustment bolts 43. One portion, here the rear portion 41, is rigidly secured, as by means of the anchor bolts 44, to the platform 15 between the ways 35. The screw 37 is rotatably supported upon the front end of the table base 36 and held against axial movement with respect thereto in a substantially conventional manner. A hand wheel 45 is secured to the front end of the screw 37 for effecting rotation thereof, hence movement of the base 36 along the ways 35.

Figure 9:
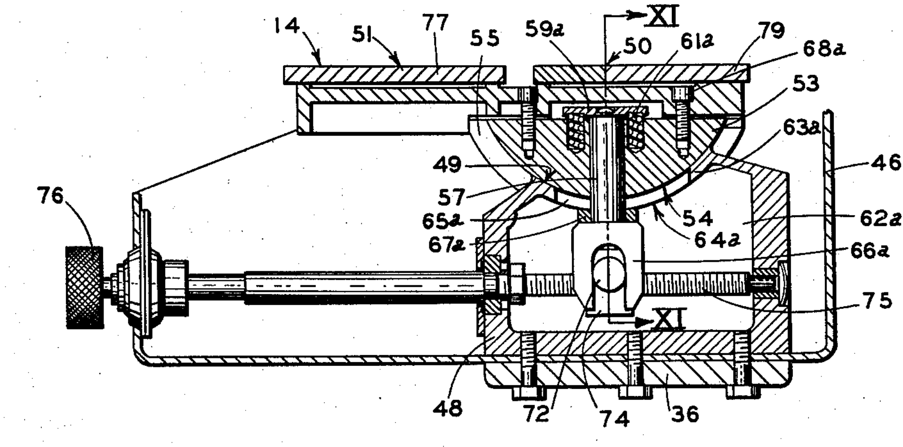
Figure 9 is a sectional view taken on the line IX—IX of Figure 3.

The table base 36 (Figures 3 and 4) extends laterally of, and above, the ways 35 and supports the bottom of a hood 46, which substantially surrounds the table 14 and the grinding wheel 11. Left and right table support members 47 and 48 (Figures 6 and 9) are mounted upon, and extend upwardly from, the table base 36 adjacent to its lateral edges (Figure 3) within the hood 46. The members 47 and 48 are preferably hollow and have concave, arcuate upper surfaces 49 having a substantially horizontal common axis 50 (Figures 4, 6 and 9) lying within the plane defined by the upper surface 51 of the table 14. A pair of table brackets 52 and 53 are secured to, and depend from, the lower surface of the table 14 near its lateral edges. Said brackets 52 and 53 have arcuate, convex lower surfaces 54, which are snugly, slidably and respectively receivable into the upper, concave surfaces 49. Side plates 55 are secured to, and extend downwardly beyond, the lateral sides of the brackets 52 and 53. Said side plates 55 embrace the lateral sides of the support members 47 and 48 when they are engaged by the brackets 52 and 53, respectively, in order to prevent dirt from entering between the brackets and their corresponding support members. The brackets 52 and 53 are slidable with respect to the support members 47 and 48 for effecting tilting of the table 14 about the axis 50.

The table 14 is held against lifting away from, and against lateral motion with respect to, the table base 36 by connector mechanisms, including a pair of posts 56 and 57, which are secured within the brackets 52 and 53, respectively, and extend downwardly therefrom through said surfaces and into the hollow support members 47 and 48. The left post 56 (Fig. 6) is slidably and snugly disposed within a post opening 58 extending through the bracket 52 and having an axis which intersects the tilting axis 50 of the table 14. A laterally extending plate 59 is secured to the upper end of the post 56 and resilient means, such as the coil springs 61, are disposed between the adjacent surfaces of the bracket 52 and the plate 59 for urging the post 56 upwardly with respect to said bracket 52. The support member 47 has a chamber 62, the upper wall 63 of which is provided with an arcuate, lower surface 64 having an axis coincident with said tilting axis 50. Thus, the lower surface of the wall 63 is symmetrical with the upper surface 49 of said wall. A circumferentially elongated slot 65 is provided through the wall 63, hence through the upper surface 49 thereof, through which the post 56 extends into said chamber 62. The post 56 has an enlarged head 66 on its lower end within the chamber 62. A washer 67, having a concave upper surface, is sleeved upon the post 56 between the head 66 and the lower surface 64 of the wall 63. Thus, the plate 59 and the washer 67 cooperate with the post 56 to prevent disengagement of the bracket 52 from the member 47 in a direction parallel with the axis of the post 56. The springs 61 impart the necessary resiliency to this connection. The table 14 may be removably secured to the bracket 52, hence to the bracket 53, by means of bolts 68.

Figure 11:
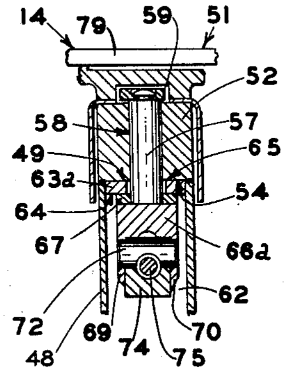
Figure 11 is a sectional view taken on the line XI—XI of Figure 9.

The bracket 53 (Figure 9) may be resiliently secured with respect to the support member 48 by means of a post 57 in substantially the same manner as set forth with respect to the post 56, the bracket 52 and the support member 47. Accordingly, parts associated with the post 57 for effecting said connection are given the same numerals, plus the sluffix "a," as the corresponding parts associated with the post 56. Post 57 differs slightly from post 56 in that the head 66*a* of post 57 (Figures 9 and 11) is provided with a pair of integral, downwardly extending yokes 69 and 70, which embrace the opposite ends of a stub shaft 72, which extends through, and from, the opposite sides of an adjustment block 74. Said yokes and adjustment block are part of a mechanism for effecting and controlling the tilting of the table 14 about the tilting axis 50. This tilting mechanism includes an adjustment screw 75, which is threadedly received through the adjustment block 74 and rotatably supported in a substantially horizontal position upon the support member 48 and the front wall of the hood 46, through which said screw extends forwardly. A hand wheel 76 (Figure 1) is mounted upon the front end of the screw 75, said screw preferably being substantially parallel with the base adjusting screw 37. Accordingly, rotation of the hand wheel 76, hence rotation of the adjustment screw 75, effects forward or rearward movement of the adjustment block 74, hence similar movement of the lower end of the post 57, whereby said table 14 is caused to tilt about its axis 50. The table 14 may include a plurality of removable and replaceable wear plates 77 (Figure 8) and a recess 78 (Figure 5) in its rearward edge, into which the grinding wheel 11 is received. The portion of the table 14 on opposite lateral sides of said recess 78 are provided with wear plates 79 and 80, which are movable toward and away from each other to vary the lateral extent of the recess 78 for reasons appearing hereinafter.

B. *Grinding wheel and wheel support*

The bearing assembly 20, which pivotally supports the support bracket 13 (Figures 1 and 4) includes a pivot shaft 82, which is substantially parallel with the extended axes of the screws 37 and 75, and is secured at its opposite ends in the blocks 83 and 84 (Figure 1) mounted upon the rearward end of the platform 15. The shaft 82 is preferably located substantially directly behind the center line of the table base 36. The support bracket 13 (Figure 4) includes a cylindrical housing 85 at its lower end, which encircles the pivot shaft 82 and is rotatably mounted upon said shaft by means of the bearings 86. Said bracket 13 also includes a support plate 87, which is secured to, and spaced from, the housing 85 by a pair of webs 88. The shaft housing 89, in which the grinder shaft 12 is rotatably supported by means of the bearings 91, is mounted upon the plate 87. The grinder shaft 12 is axially parallel with the pivot shaft 82 and extends both forwardly and rearwardly from within the shaft housing 89.

A grinding wheel mount 92 (Figure 4) is rigidly secured to the front extension 93 of the shaft 12 by means of a bolt 94 in a substantially conventional manner. The rearward face of the wheel mount 92 and the forward, annular end wall 95 of the shaft housing 89 are provided with a suitable sealing device for preventing the waste materials of the grinding operation from getting into the bearings 91. The grinding wheel 11 is secured to the front surface of the wheel mount 92, as by means of bolts 96 (Figure 4), so that the planar grinding face of said wheel 11 lies in a substantially vertical plane and said wheel can be disposed adjacent to, and parallel with, the edge 78*a* of the table 14 within the recess 78.

C. *Wheel guard and table extensions*

Figure 3:
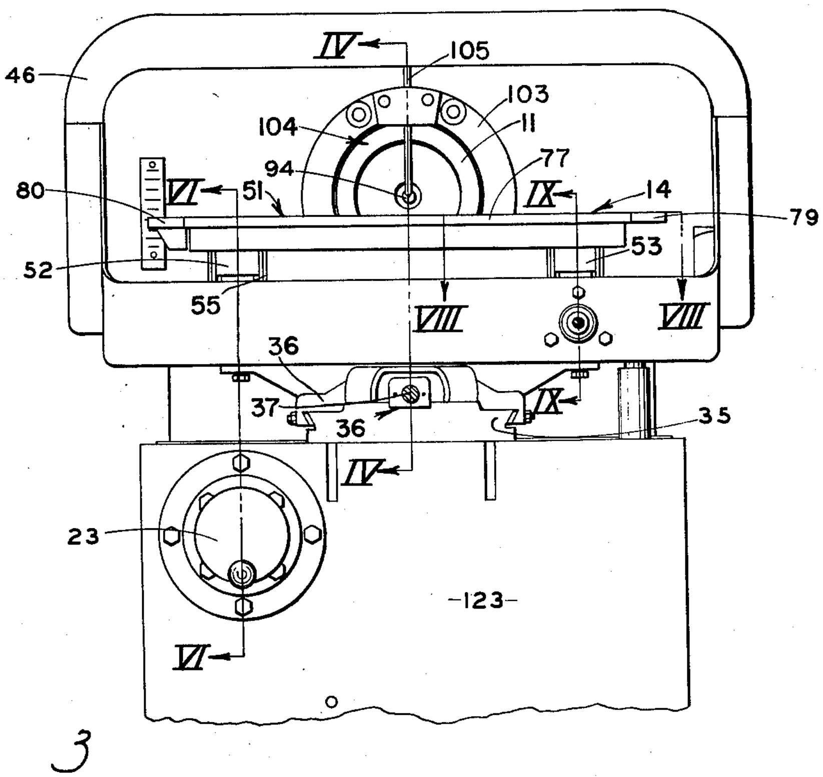
Figure 3 is a sectional view taken on the line III—III of Figure 1.
Figure 8:
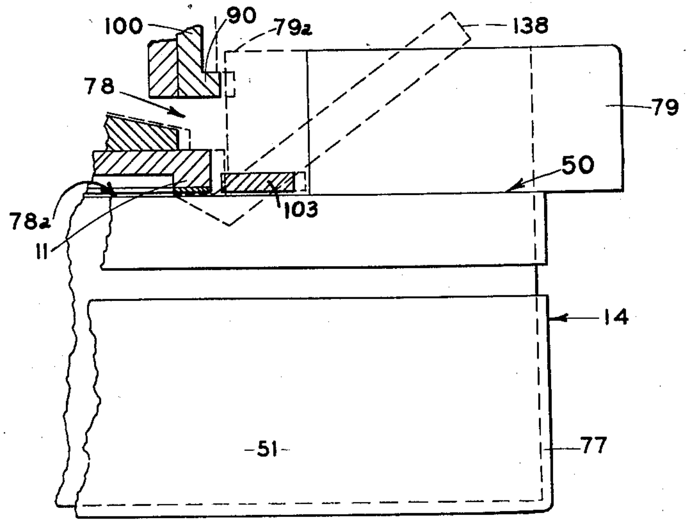
Figure 8 is a sectional view taken on the line VIII—VIII of Figure 3.
Figure 4:
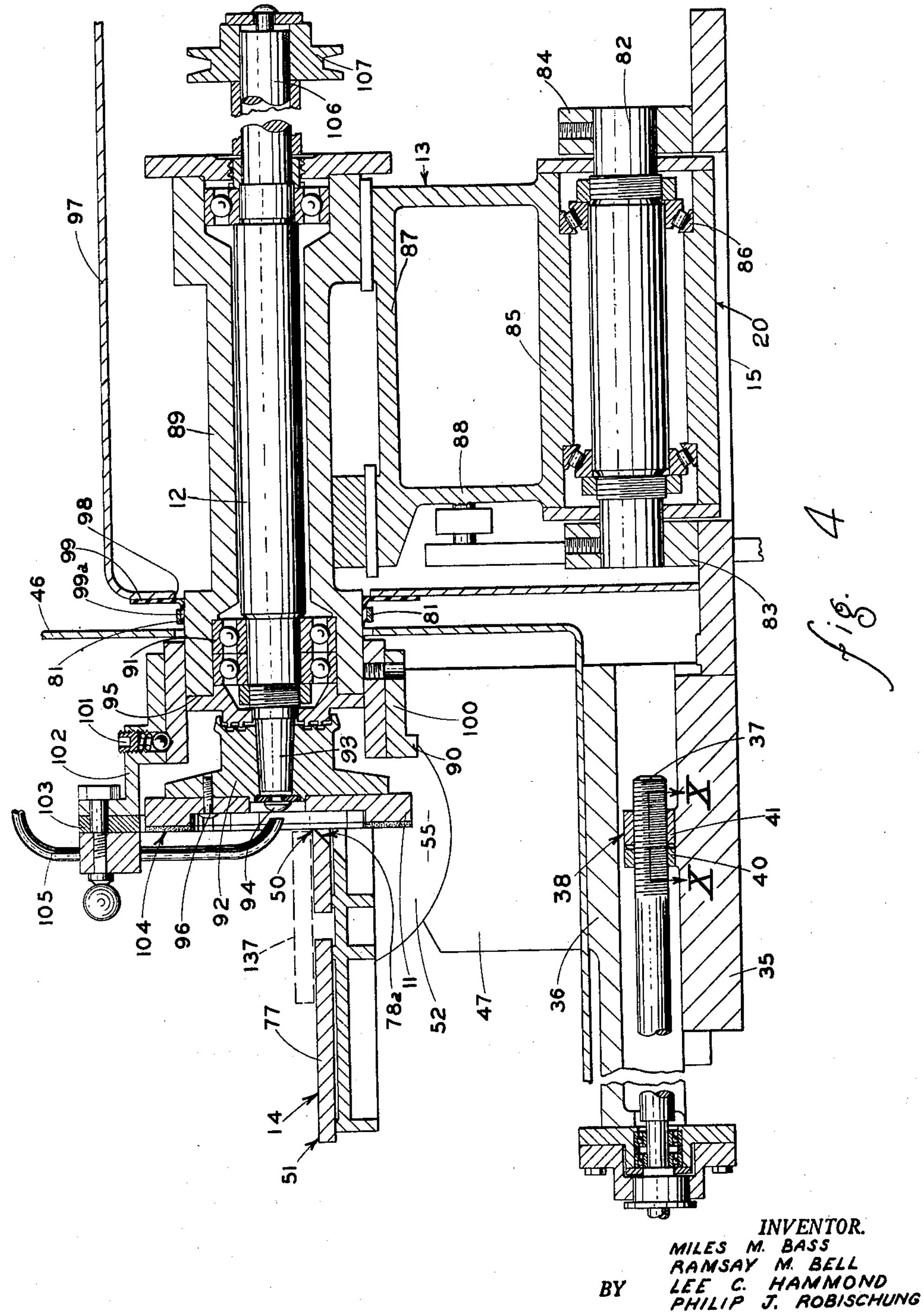
Figure 4 is a sectional view taken on the line IV—IV of Figure 3.
Figure 5:
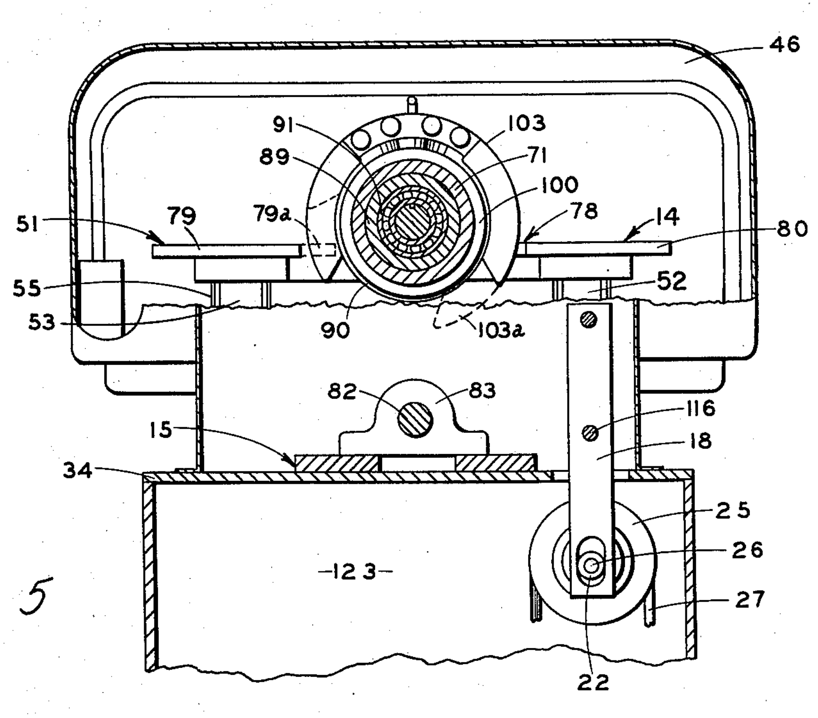
Figure 5 is a sectional view taken on the line V—V of Figure 1.

A sleeve 100 (Figure 4) is adjustably supported upon the forward end of the shaft housing 89 for controlled movement about the shaft 12 in both rotational directions. A detent mechanism 101 tends to hold the sleeve 100 in selected positions with respect to the shaft housing 89. Said sleeve 100 is disposed within the hood 46 and supports a forwardly extending, arcuate flange 102, upon which the arcuate guard element 103 is secured. In this particular embodiment, the tilting axis 50 of the table 14 is disposed somewhat below the axis of the grinding shaft 12. However, the opposite ends of the arcuate guard 103 are capable of extending simultaneously below said table upper surface 51 in one selected position of said guard, effected by appropriate positioning of the sleeve 100 upon the shaft housing 89. The guard 103 is spaced slightly radially outwardly of the grinding wheel 11, and the front surface of said arcuate guard 103 is preferably substantially co-planar with the front, or grinding, surface 104 of the wheel 11. Said sleeve 100 also has an annular flange 90 (Figures 4 and 8), preferably near its forward edge, which extends radially beyond the periphery of the grinding wheel 11. The flange 90 prevents the wheel 11 from striking those portions of the table 14 on opposite sides of the recess 78 when said wheel 11 is oscillated and the guard 103 is removed from, or repositioned on, the housing 89. As shown in Figures 3, 5 and 8, the end wear plates 79 and 80, which are disposed on the table 14 radially outwardly from the grinding wheel 11, are in their normal, or extended, position when the arcuate guard 103 is centered. However, when said guard 103 is moved for purposes appearing hereinafter, to its broken line position 103*a*, as shown in Figure 5, the end plate 79 adjacent to that end of the guard 103 which is raised above the level of the table may be moved in adjacent to the peripheral edge of the grinding wheel 11, as indicated at 79*a*, or as close as the flange 90 on the sleeve 100 will permit.

Means, including the tube 105, is supported by the flange 102 for directing cooling and/or grinding fluid at the center of the wheel 11.

The support bracket 13 and that portion of the shaft 12 and the shaft housing 89 disposed outside of the hood 46 are substantially enclosed by an enclosure 97 (Figure 4), which is mounted upon the frame 10 and has an opening 98 in its front wall, through which said shaft housing 89 extends. The opening 98 is laterally elongated to permit oscillation of said housing 89 with respect to the enclosure 97. The space between the housing 89 and the enclosure 97 is closed by an annular sheet 99 having a flanged, internal edge 99*a*, which snugly embraces the housing 89. Said flanged edge 99*a*, hence the sheet 99, is secured to the housing 89 by a resilient ring 81 and said sheet 99 slidably and snugly engages the front wall of the enclosure 97 to provide a dust seal.

D. *Wheel drive mechanism*

The rear extension 106 of the shaft 12 supports a pulley 107 (Figures 1 and 4), which is connected to a pulley 108 by the belt 16, said pulley 108 being mounted upon the shaft of the motor 17. The motor 17 is supported below the platform 15, in this particular embodiment, upon a motor mount 109 so that the axis of said motor is parallel with the shaft 12. The motor mount 109 is pivotally supported along one edge thereof, parallel with said motor axis, upon a pivot shaft 111, which is supported upon the frame 10. An arm 112 extends from the opposite edge of said motor mount 109 and supports a substantially horizontal pin 113 near its free end, which pin slidably extends through a lengthwise slot 114 in the support bar 115 near the lower end thereof.

The upper end of said bar 115 (Figures 1 and 2) is pivotally mounted upon the upper wall 34 of the machine frame 10. The pin 113 is snugly, but slidably, disposed within the slot 114 between the upper and lower ends thereof when the belt 16 is properly mounted upon, and between, the pulleys 107 and 108. Thus, since the motor mount 109 is free to rotate about the pivot shaft 111, within the limits of the slot 114, the motor 17 and the mount 109 are at least partially supported by the shaft 12. If, for any reason, the belt 16 should break during operation, the motor mount 109 will drop a short distance until the pin 113 engages the lower end of the slot 114, whereupon said support bar 115 will prevent further downward movement of said motor mount. This arrangement also maintains proper tension in the belt 16 in spite of the variations in the vertical position of the shaft 12 resulting from its arcuate movement as it is being pivoted about the axis of the shaft 82 by means disclosed immediately hereinafter.

E. *Oscillatory drive mechanism*

The pitman 21 is pivotally supported at one end upon the front web 88 between the support plate 87 and the cylindrical housing 85. The other end of said pitman 21 is pivotally secured to the upper end of the lever 18, which lever is pivotally supported between its upper and lower ends by a pivot shaft 116 and a pillow block 19 mounted upon the top wall 34 adjacent to the bearing assembly 20. The lower end of the lever 18 is provided with a slot 118 which is elongated lengthwise of said lever 18. The roller 22 (Figures 5, 6 and 7) is rotatably disposed within the slot 118 and is engageable with the side walls of said slot. The shaft 26 is rigidly secured to an adjustment block 119 (Figure 7), which is part of the adjustment mechanism 24 for effecting movement of the roller 22 into and out of positions of concentricity with the pulley 25.

Figure 6:
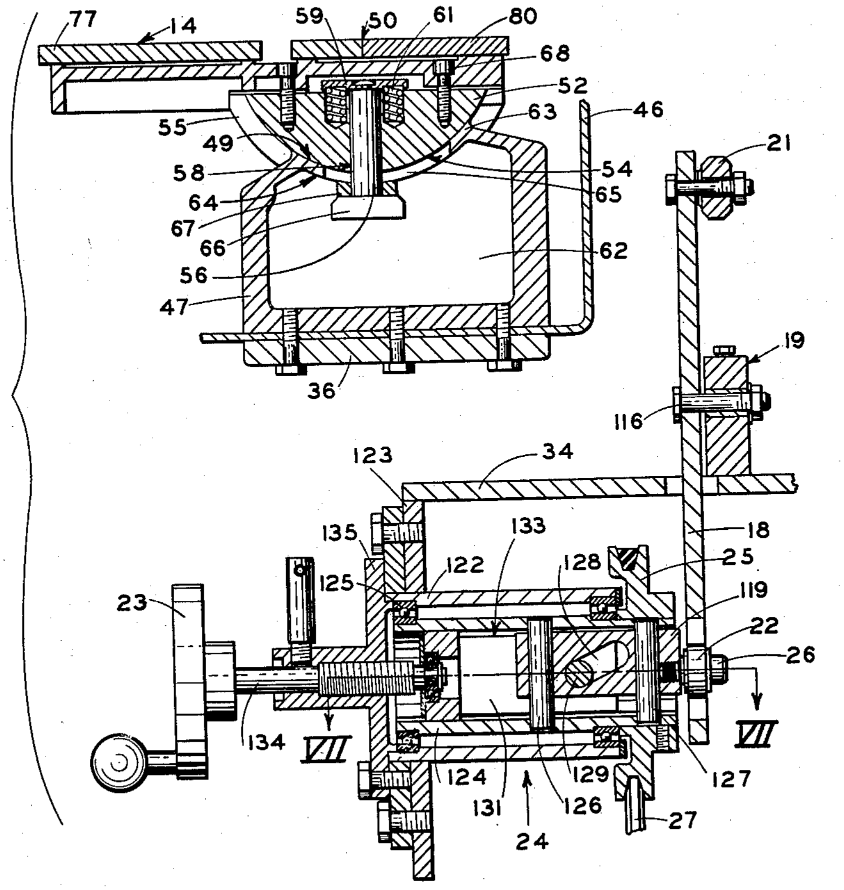
Figure 6 is a sectional view taken on the line VI—VI of Figure 3.

The adjustment mechanism 24 (Figures 6 and 7) is comprised of an outer cylindrical housing 122, which is supported upon the front wall 123 of the machine frame 10 and rotatably supports an inner, cylindrical housing 124 by means of the bearings 125. Said inner and outer housings are concentric and their axis is preferably parallel with the pivot shaft 82. The inner housing 124 extends slightly rearwardly of the outer housing 122 to mount the pulley 25. A pair of spaced, transverse, substantially parallel slide rods 126 and 127 extend diametrically through, and are secured to, the inner housing 124. Said rods 126 and 127 slidably support the adjustment block 119 within the inner housing 124 for movement in a direction parallel with said slide rods. Said adjustment block 119 is provided with an elongated opening 128, which is transverse of the slide rods 126 and 127 and elongated in a direction which, if projected, would intersect said rods 126 and 127 at an acute angle, such as approximately 60° (Figure 6). An adjustment rod 129 extends through the opening 128 and is engaged at its opposite ends by the arms 131 and 132 of a yoke 133, which embraces opposite sides of the adjustment block 119. The yoke 133 is movable within, and lengthwise of, the inner housing 124, whereas the adjustment block 119 is movable transversely of said inner housing 124, but not lengthwise thereof. Thus, when the yoke 133 is moved lengthwise of said inner housing 124, such movement will be translated into transverse movement of the adjustment block 119 as a result of the cam action of the walls of the elongated opening 128 upon the adjustment rod 129, depending upon the direction of movement of said yoke 133.

The front end of the yoke 133 (Figures 6 and 7) rotatably supports the rearward end of an adjustment screw 134, which is co-axial with, and extends into, the inner housing 124. Said screw 134 extends forwardly through, is threadedly engaged by, and is supported upon, a hub 135 (Figure 1), which hub is supported upon the front wall 123 of the frame 10. The hand wheel 23, for effecting rotation of the screw 134, is mounted on the front end of said screw 134. Thus, by appropriate rotation of the wheel 23, the roller 22 is caused by the adjustment mechanism 24 to move into and/or out of a position of concentricity with the pulley 25.

The pulley 25 is connected by the belt 27, in a substantially conventional manner, to the output of the speed reducer 28, which is controlled by the hand wheel 31 mounted thereon, and which is connected to the motor 29, also in a substantially conventional manner. A pump 136 (Figure 2) may be provided for forcing a coolant or lubricant through the tube 105 and returning said fluid to the pump from its point of collection in the hood 46 by conventional means, not shown.

F. *Alternate oscillatory drive mechanism*

As shown in Figures 12, 12*a*, 13 and 14, alternate mechanism 141 may be provided for effecting and controlling the reciprocation of the support bracket 13, hence the grinding wheel 11 rotatably supported thereby. In said alternate mechanism 141, a crank 142 is secured to, and extends sidewardly from, a portion of the bracket 13, such as the cylindrical housing 85. The free, or rightward, end of the crank 142 is pivotally engaged by one end of a lever 143, which has a lengthwise slot 144 through the opposite end thereof. A roller 145, which is rotatably supported upon a crank 147, is received within the slot 144 for movement lengthwise thereof. The shaft 148 of said crank 147 is rotatably supported within a pillow block 149 mounted upon a base plate 151, which in turn is mounted upon the upper wall 34 of the machine frame 10. That end of the crank shaft 148 remote from the crank 147 mounts a pulley 152, which may be directly connected by the belt 153 to a speed reducer 154, which may be substantially the same as the speed reducer 28.

The lever 143 (Figures 12 and 13) is slidably and snugly receivable through an opening 155 in the pivot block 156, which block has a pair of coaxial stub shafts 157 and 157*a* extending from the opposite sides thereof in a substantially horizontal direction transverse of the lengthwise extent of the lever 143. Said stub shafts 157 and 157*a* are rotatably supported, as by means of the bearings 158, upon the spaced, upstanding arms 159 of the bifurcated bearing support 161. Said bearing support 161 is slidably supported upon the base plate 151 between parallel guide ways 162 in the upper surface thereof, for movement lengthwise of the guide ways 162. An adjustment screw 163 extends through, and is threadedly engaged by, an appropriate opening in the bearing support 161 adjacent to said base plate 151. The adjustment screw extends lengthwise of, and is substantially parallel with, the guide ways 162 and is rotatably supported near its right end within the pillow block 164 mounted upon said base plate 151. A hand wheel 165 is secured to the right end of the adjustment screw 163 for effecting rotation thereof.

When the bearing support 161 is in the position shown in Figure 12, rotation of the pulley 152, hence of the crank 147, effects a reciprocable movement of both ends of the lever 143 because the pivotal axis is between the lever ends. Thus, the crank 142 and the bracket 13 are caused to reciprocate in a manner similar to that discussed above with respect to the structure shown in Figure 1.

When the bearing support 161 is moved to the position shown in Figure 12*a*, by appropriate rotation of the adjustment screw 163, the pivotal axis of said lever with respect to the bearing support 161 will be coincident with the pivotal axis of said lever with respect to the crank 142. Thus, vertical reciprocation of the rightward end of the lever 143 by the crank 147 will not effect a reciprocable movement of either the crank 142 or the support bracket 13.

OPERATION

Prior to operating the grinding machine to which this invention relates, certain adjustments may be required in order to properly prepare said machine for said operation. Having selected a grinding wheel 11 having the proper type of grinding face 104, said wheel is mounted upon the wheel mount 92 (Figure 4) by the bolts 96. During the securing of said wheel 11 on the mount 92, it may be advantageous to move the table 14 forwardly, away from the wheel mount 92. This is accomplished by turning the hand wheel 45 in the proper direction, whereby the table base 36 will be moved along the ways 35 by the operation of the screw 37 and the split nut 38 in a manner which will be apparent. By proper adjustment of the bolts 43 on the nut 38, play between the threads of the screw and the nut may be substantially eliminated, thereby permitting extremely fine and accurate adjustments.

After the grinding wheel 11 (Figure 4) is secured in place with respect to the shaft or spindle 12, the table 14 is then moved rearwardly until the rearward edge 78*a* (Figures 4 and 8) of said table 14 within the recess 78 and between the end wear plates 79 and 80 (Figure 5) is spaced a relatively slight distance from the front face 104 of the grinding wheel 11. Where the tool, such as that indicated in broken lines at 137 in Figure 4, is of the type which may be supported upon thte wear plates 77 in front of the grinding wheel 11, the horseshoe-shaped guard 103 (Figures 3 and 5), which encircles the exposed portions of the periphery of the grinding wheel 11, will be disposed so that its opposite ends are below the surface of the table 14, as shown in Figure 5. In such case, the end wear plates 79 (Figures 3 and 8) will be moved laterally outwardly of the edges of the other wear plates 77. However, if it becomes desirable to work on a hook-type tool of the type shown in broken lines at 138 in Figure 8, then the guard 103 may be rotated in one direction or the other around the axis of the shaft 12 into a position to expose the periphery of the wheel 11, as indicated in broken lines at 103*a* in Figure 5. The end wear plate 79 adjacent to the exposed portion of said wheel is then moved into a position, as shown in broken lines at 79*a* in Figure 8, so that it can hold the tool 138, which must extend partially behind the plane defined by the grinding face 104.

The table 14 is then adjusted into proper position with respect to the grinding face 104 (Figure 4) by rotating the hand wheel 76 (Figure 6), whereby the adjustment screw 75 secured thereto causes the adjustment block 74 to be moved either forwardly or rearwardly of the machine. Such movement of the adjustment block 74 is translated through the yokes 69 and 70 and the post 57 into a tilting movement of the table 14 about its tilting axis 50. When the proper adjustment of the table has been obtained, the motor 17 can then be energized, thereby causing the shaft 12 and grinding wheel 11 to rotate. The motor 29 is also energized, which drives the speed reducer 28, which in turn rotates the pulley 25 of the adjustment mechanism 24. The pulley 25, acting through the inner housing 124 and the adjustment block 119, causes the shaft 26, hence the roller 22, to rotate about the axis of the inner housing 124.

If the axis of the roller 22 (Figures 6 and 7) is eccentric with respect to the axis of the pulley 25, rotation of the pulley 25 will effect a reciprocable pivoting of the lever 18 about the pivotal axis provided by the lever bearing 19. Such reciprocation will be transmitted by the pitman 21 (Figure 2) to the support bracket 13 for effecting a corresponding pivotal reciprocation of said support bracket about the pivotal axis thereof provided by the bearing assembly 20. This will cause the shaft 12 to oscillate through a relatively small arc crosswise of the machine, the tangent of said arc at its midpoint being substantially parallel to the pivot axis 50 of the table 14, and thereby effect a similar lateral oscillation of the grinding wheel 11. Where the grinding wheel, as shown here, has a relatively narrow grinding face 104, the oscillation of the grinding wheel will be relatively small and, as a general rule, will be somewhat less than the radial width of the grinding face on said wheel 11. Thus, the path traversed by the axis of the shaft 12 during said oscillations, although arcuate, will be relatively flat and substantially parallel to pivot axis 50 of the table 14. However, since the path of oscillation of said shaft 12 is arcuate, and since the radius of this arc is substantially less than, here approximately one-half of, the axial distance between the shaft 12 and the shaft of the driving motor 17, some provision must be made for keeping the belt 16 under uniform tension during the operation. This is accomplished by pivotally supporting the motor mount 109 upon the pivot shaft 111 so that said motor partially hangs upon the belt 16. Thus, as the shaft 12 moves upwardly and downwardly a relatively small distance during the arcuate movement thereof, the motor 17 is free to move upwardly and downwardly this same slight distance.

The flexible and resilient annular sealing sheet 99 (Figure 4) permits movement of the shaft housing 89 with respect to the enclosure 97 during the oscillation of said shaft housing 89 without impairing the seal provided thereby. The opening 93 in the enclosure 97, through which the shaft housing 89 extends, is sufficiently large to permit the desired oscillation of the shaft housing 89.

Figure 7:
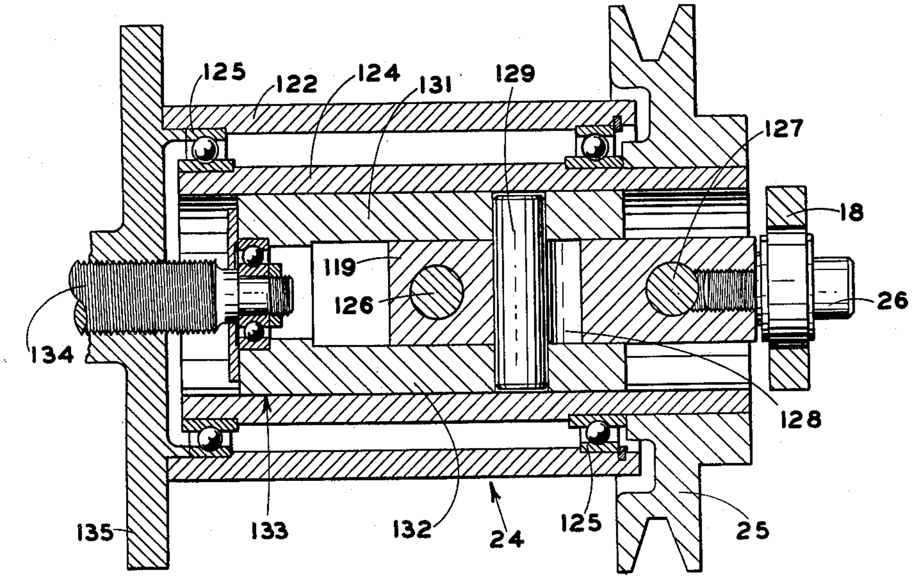
Figure 7 is a sectional view taken on the line VII—VII of Figure 6.

Adjustment of the oscillation distance or amplitude of the shaft 12 is effected by turning the hand wheel 23 associated with the adjustment mechanism 24. As shown in Figures 6 and 7, turning of the hand wheel 23 effects either a forward or rearward movement of the yoke 133, whereby the adjustment block 119, which supports the shaft 26, is moved in a direction transversely of the axis of the inner housing 124. This movement of the block 119 produces a corresponding radial movement of the roller 22, thereby causing or changing the eccentricity in the axis of the roller 22 with respect to the inner housing 124. By appropriate adjustment of the hand wheel 23, the roller 22 can be caused to be completely concentric with the pulley 25, whereby the grinding wheel 11 can be caused to rotate without any reciprocation or oscillation whatsoever. When the oscillation of the grinding wheel shaft 12 has been set, the pump 136 can be turned on, thereby causing coolant or lubricating fluid to pass through the tube 105 and bear against the center of the grinding wheel 11 in a substantially conventional manner.

It will be recognized that the adjustment of the table 14, the guard 103, the end wear plates 79 and 80, the adjustment mechanism 24 and the speed reducer 28 can be effected while the machine is in operation.

The necessary adjustments having thus been completed, the tool, either as shown at 137 in Figure 4 or at 138 in Figure 8, is placed upon the table 14 and held there, either manually or by mechanical means, while the grinding wheel 11 and the guard 103 reciprocate with respect to the table 14, as indicated by the solid line and broken line positions of these parts in Figure 8. The grinding wheel 11 is protected from striking those edges of the table 14 which define the lateral ends of the recess 78 by the flange 90 on the sleeve 100, which flange extends radially beyond the periphery of the wheel 11. The guard 103 provides additional protection, both for the wheel 11 and the hands of the workman, by closely surrounding the portion of the wheel 11 exposed above the table 14.

Where the grinding machine is provided with the alternate mechanism 141 for effecting reciprocation and rocking of the support bracket 13 and the grinding wheel 11 supported thereby, the pitman 21, lever 18 and adjustment mechanism 24 utilized in the principal structure may be omitted. The pulley 152 on the alternate mechanism 141 is connected to a speed reducer 154 and the bearing housing 85 is provided with a crank 142, which is operable by the alternate mechanism 141. The lever 143 is pivoted, as indicated at **143*a*** in Figures 12 and 12*a*, by the pulley 152 operating through the crank shaft 148, the crank 147 and the roller 145. By moving the bearing support 161 with respect to the pivot between the lever 143 and the crank 142, the amount of oscillation produced by the alternate mechanism 141 may be varied. Where the bearing support 161 is moved to the position shown in Figure 12*a*, so that the axis of its bearing 158 is coincidental with the pivotal axis between the crank 142 and lever 143, the alternate mechanism 141 will impose no reciprocation upon the crank 142, hence the support bracket 13 will remain motionless, even though the lever 143 is being pivoted. From this position of no reciprocation, reciprocation can be effected and steadily increased by moving the bearing support 161 along the base plate 151 away from the crank 142 by rotating the screw 163.

Although particular, preferred embodiments of the invention have been disclosed hereinabove for illustrative purposes, it will be understood that variations or modifications thereof, which do not depart from the scope of such disclosure, are fully contemplated unless specifically stated to the contrary in the appended claims.

We claim:

1. A grinding machine, comprising in combination: a support frame; a grinding wheel; a horizontal, rotatable shaft supporting said grinding wheel; a bracket pivotally supported near its lower end on said frame for oscillation with respect thereto about a horizontal axis; means rotatably supporting said shaft on said bracket near the upper end thereof; a work supporting table adjustably supported on said frame and positioned in front of said grinding wheel for movement toward and away therefrom; a horizontal actuating shaft rotatably supported on said support frame below said table and extending forwardly therefrom and means connecting said actuating shaft to said table for moving said table toward and away from the grinding wheel in response to rotation of said actuating shaft; a first handle on said actuating shaft whereby said actuating shaft may be manually rotated; a first motor and means connected thereto and to said grinding wheel shaft for rotating said grinding wheel shaft; a second motor; adjustable linkage connected to said second motor and to said bracket for oscillating said bracket and thereby oscillating said grinding wheel in a plane transverse to the rotational axis thereof in response to rotation of said second motor; said linkage including a horizontal, rotatable, threaded adjusting shaft supported in said frame below said table and extending forwardly therefrom, said adjusting shaft being parallel with said actuating shaft, a crank having a radially adjustable crank pin whose position is adjustable by rotation of said adjusting shaft, a pulley mounted on said crank and a belt connecting said pulley to said second motor, a lever having an opening therein into which said crank pin extends, said lever being connected to said bracket above the pivot axis therefor for oscillating said bracket and thereby oscillating said grinding wheel in a plane transverse to the rotational axis thereof and means operable in response to rotation of said adjusting shaft for adjusting the pivotal movement of said lever and thereby adjusting the oscillation of said bracket, a second handle connected to said adjusting shaft for rotating same and thereby adjusting the angular extent of the oscillation of said grinding wheel; said first and second handles being positioned in front of the suport frame and adjacent the grinding wheel whereby the operator may adjust the position of the work supporting table and the angular extent of oscillation of the grinding wheel from a location in front of the support frame.

2. A grinding machine, comprising in combination: a support frame; a grinding wheel; a horizontal rotatable shaft supporting said grinding wheel; a support bracket pivotally supported near its lower end on said frame for oscillation with respect thereto; means rotatably supporting said shaft on said support bracket near the upper end thereof; a work supporting table supported on said frame and positioned in front of said grinding wheel; a horizontal pivot shaft extending substantially parallel with and located below said grinding wheel shaft; a motor bracket supported for pivotal movement on said pivot shaft and a first motor mounted on said motor bracket, the shaft of said motor and said grinding wheel shaft each having a pulley thereon and a belt mounted on said pulleys whereby said grinding wheel shaft is driven by said motor to drive said grinding wheel, said belt in part supporting the weight of said motor; guide means affixed to said support frame for limiting pivotal movement of said motor bracket; a second motor mounted on said support frame; adjustable linkage connected to said second motor and to said support bracket for oscillating said support bracket and thereby oscillating said grinding wheel in a plane transverse to the rotational axis thereof.

3. A grinding machine, comprising in combination: a rigid, closed support frame having a substantially horizontal upper wall; an enclosure mounted on said upper wall; a horizontal pivot shaft mounted on said upper wall and a support bracket supported adjacent its lower end on said pivot shaft for pivotal movement with respect to said support frame; a shaft housing rigidly mounted on the upper end of said bracket; a horizontal shaft rotatably supported in and extending through said shaft housing, said shaft extending through an opening in the front end of said enclosure and being movable transversely therein; a grinding wheel mounted on said shaft and located in front of said enclosure; ways rigidly secured to said upper wall; a base mounted for movement along said ways toward and away from said grinding wheel; a horizontal rotatable shaft connected to said base for moving said base along said ways in response to rotation of said shaft; a hood structure mounted on said base for movement therewith, said hood extending upwardly from said base and encircling the periphery of said grinding wheel; a work support table mounted on said base for movement therewith and positioned in front of said grinding wheel and means for tilting said table with respect to said grinding wheel; a horizontal motor support pivot shaft pivotally supported within said support frame and having a motor bracket thereon; a first motor mounted on said motor bracket for pivotal movement on said motor support pivot shaft; a pulley on the shaft of said motor and a pulley on said grinding wheel shaft; a belt on said pulleys for driving said grinding wheel shaft from said motor shaft, said belt partially supporting the weight of said motor; guide means on said support frame for guiding and limiting pivotal movement of said motor bracket; a bracket mounted in said support frame adjacent the lower end thereof; a second motor mounted on said last-named bracket, said second motor having a pulley on the shaft thereof; an adjustment mechanism including a cylindrical housing mounted on the forward wall of said support frame adjacent the upper end thereof; a pulley rotatably mounted on said housing and a belt connecting said pulley for rotation by said pulley on said second motor shaft, adjustable linkage driven by said pulley on said housing and extending upwardly through said upper wall and connected to said support bracket above said first mentioned pivot shaft for oscillating said support bracket and thereby oscillating said grinding wheel in a plane transverse to the rotational axis thereof, said linkage including a rotatable shaft extending through the front wall of said support frame and through said cylindrical housing, said shaft being effective for adjusting the oscillation of said support bracket.

4. A grinding machine, comprising in combination: a rigid, closed support frame having a substantially horizontal upper wall; an enclosure mounted on said upper wall; a horizontal pivot shaft mounted on said upper wall and a support bracket supported adjacent its lower end on said pivot shaft for pivotal movement with respect to said support frame; a shaft housing rigidly mounted on the upper end of said bracket; a horizontal shaft rotatably supported in and extending through said shaft housing, said shaft extending through an opening in the front end of said enclosure and being movable transversely therein; a grinding wheel mounted on said shaft and located in front of said enclosure; ways rigidly secured to said upper wall; a base mounted for movement along said ways toward and away from said grinding wheel; a horizontal rotatable shaft connected to said base for moving said base along said ways in response to rotation of said shaft; a hood structure mounted on said base for movement therewith, said hood extending upwardly from said base and encircling the periphery of said grinding wheel; a partially cylindrical guard rotatably mounted on said shaft housing and partially surrounding the periphery of the grinding wheel; means for releasably locking said guard to said shaft housing in a circumferentially adjustable position with respect to said wheel; a work support table mounted on said base for movement therewith and positioned in front of said grinding wheel, said table having a pair of extension plates opposed to the periphery of said grinding wheel on either side thereof and means supporting said extension plates for movement substantially radially toward and away from said grinding wheel; means for tilting said table with respect to said grinding wheel; a first motor mounted in said support frame and means extending through said upper wall connecting said motor to said grinding wheel shaft whereby said shaft is driven thereby; a second motor mounted in said support frame and means including adjustable linkage connecting said second motor to said bracket whereby said bracket may be oscillated to thereby oscillate said grinding wheel in a plane transverse to the rotational axis thereof.

5. A grinding machine, comprising in combination: a rigid support frame having a substantially horizontal upper wall; an enclosure mounted on said upper wall; a horizontal pivot shaft mounted on said upper wall and a support bracket supported adjacent its lower end on said pivot shaft for pivotal movement with respect to said support frame; a shaft housing rigidly mounted on the upper end of said bracket; a horizontal shaft rotatably supported in and extending through said shaft housing, said shaft extending through an opening in the end of said enclosure and being movable transversely therein; a grinding wheel mounted on said shaft and located in front of said enclosure; a base supported on said upper wall and located adjacent said grinding wheel; a hood structure mounted on said base, said hood extending upwardly from said base and encircling the periphery of said grinding wheel; a partially cylindrical guard rotatably mounted on said shaft housing and partially surrounding the periphery of the grinding wheel; means for releasably locking said guard to said shaft housing in a circumferentially adjustable position with respect to said wheel, a work support table mounted on said base for movement therewith and positioned in front of said grinding wheel, said table having a pair of extension plates opposed to the periphery of said grinding wheel on either side thereof and means supporting said extension plates for movement substantially radially toward and away from said grinding wheel; a first motor mounted in said support frame and means extending through said upper wall connecting said motor to said grinding wheel shaft whereby said shaft is driven thereby; a second motor mounted in said support frame and means including adjustable linkage connecting said second motor to said bracket whereby said bracket may be oscillated to thereby oscillate said grinding wheel in a plane transverse to the rotational axis thereof.

References Cited in the file of this patent

UNITED STATES PATENTS

| | | |
|---|---|---|
| 947,774 | Germain et al. | Jan. 25, 1910 |
| 1,032,758 | Lumsden | July 16, 1912 |
| 1,187,753 | Lumsden | June 20, 1916 |
| 1,193,525 | Dosch et al. | Aug. 8, 1916 |
| 1,546,453 | Oliver | July 21, 1925 |
| 1,563,712 | Johnson | Dec. 1, 1925 |
| 1,664,949 | Sann | Apr. 3, 1928 |
| 2,021,602 | Jackson | Nov. 19, 1935 |
| 2,307,382 | Boller | Jan. 5, 1943 |
| 2,361,550 | Krueger | Oct. 31, 1944 |
| 2,411,052 | Oakley | Nov. 12, 1946 |
| 2,741,880 | Falls | Apr. 17, 1956 |